C. W. F. HANSEN.
CONVEYER.
APPLICATION FILED FEB. 17, 1913.
1,096,713.
Patented May 12, 1914.
2 SHEETS—SHEET 1.
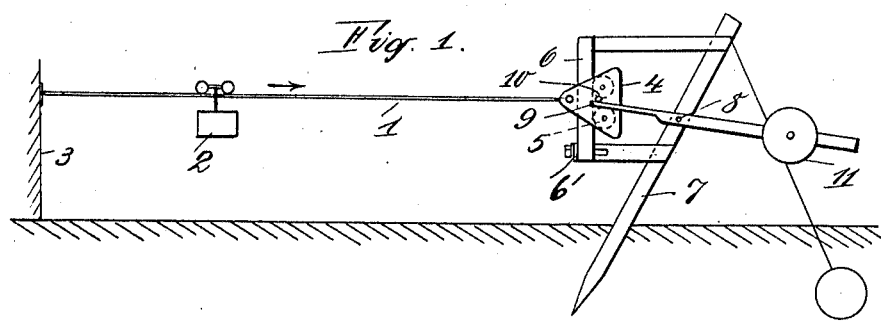
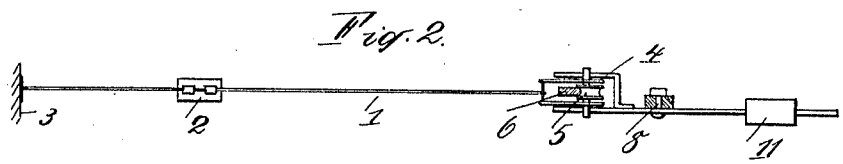
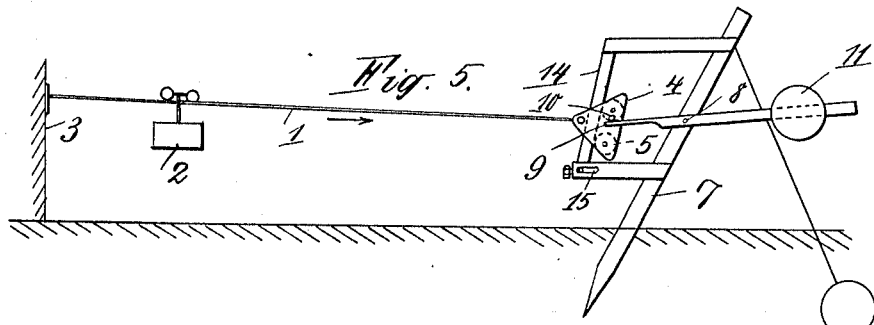
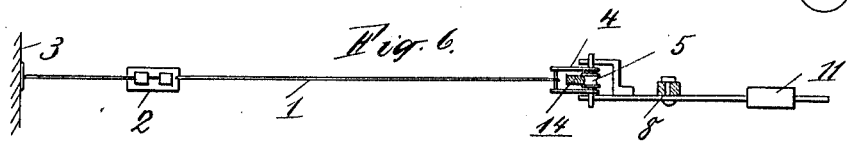
Witnesses:
Inventor:
Christoph W. F. Hansen

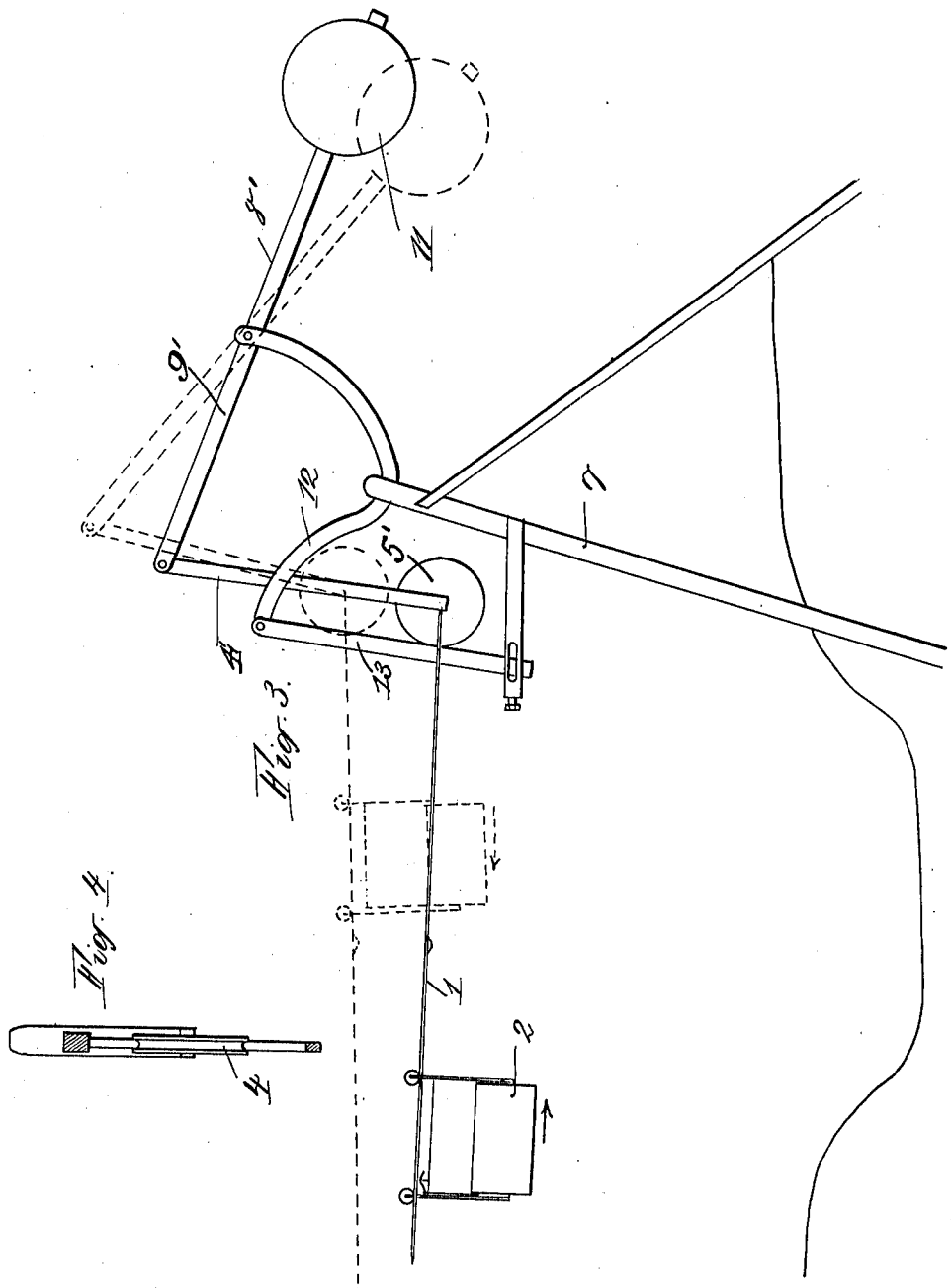

UNITED STATES PATENT OFFICE.

CHRISTOPH W. F. HANSEN, OF FLENSBURG, GERMANY.

CONVEYER.

1,096,713.  Specification of Letters Patent.  Patented May 12, 1914.

Application filed February 17, 1913. Serial No. 748,894.

*To all whom it may concern:*

Be it known that I, CHRISTOPH W. F. HANSEN, subject of the Emperor of Germany, residing at Flensburg, Germany, have invented certain new and useful Improvements in Conveyers, of which the following is a specification.

This invention relates to improvements in conveyers, and particularly to conveyers of that type in which a cable or track has a movable end or ends which automatically rise and lower as a traveler, carrying a bucket or similar carrier, moves backwardly and forwardly in said cable, the relative change in elevation of the two ends of the cable or track permitting the passage of said traveler over the cable or track.

In apparatus of this character heretofore employed, the arrangement has usually consisted of a cable, one of whose ends is secured to a vertically movable truck, and a traveler carrying a bucket or other load-holding device, the tension being such, that when a load is carried in the bucket, it will travel toward the movable end of the cable on said truck, causing the latter to descend and gradually creating for itself an incline in the direction of its travel. When the carrier is unloaded, the tension is such that said truck will rise, elevating the movable end of the cable and inclining the latter gradually in the opposite direction, as said carrier moves toward its first starting point, so as to free the movable cable end of its weight. However, apparatus of this type is only efficient for conveyers of comparatively short length due to the difficulty of maintaining a proper tension in the cable and also because of temperature changes which effect the tension in long stretches of cable.

It is the object of the present invention to avoid the above disadvantages, and to provide a tilting gravity track conveyer which will be efficient for comparatively long or short cable lengths while possessing a maximum degree of simplicity of construction and operation.

In carrying out the invention, the movable truck heretofore mentioned is combined with a counter-weighted member which coöperates with the bucket, in its loaded or unloaded condition, to permit it to move forwardly or to cause it to move backwardly, respectively, as the case may be. Thus, as the loaded bucket moves forward, the counterweight is elevated, and, when the bucket is dumped, the energy stored in said counterweight causes the truck to move upwardly, carrying therewith the track or cable, and causing the bucket to return to normal position. In this manner the original tension of the cable is unchanged, no matter where the bucket carrier is positioned, the return of the bucket being wholly effected by the action of the counterweighted member.

In the drawings, which form a part of this specification, Figure 1 is an elevation of the conveyer apparatus forming the subject matter of the present invention, Fig. 2 is a plan view, partly in section of the device of Fig. 1, Fig. 3 shows an elevation of a second form of the apparatus, Fig. 4 is a detail view of the form shown in Fig. 3, Fig. 5 is an elevation of a modification of Fig. 1, Fig. 6 is a plan of Fig. 5, partly in section.

In the form shown in Figs. 1 and 2, 1 indicates a track or cable having one end fixed to a suitable support 3, while the opposite end is movably supported by a truck 4. The bucket or other suitable carrier 2 is suspended from the cable 1 by means of a wheeled carrier which is free to run backwardly and forwardly upon said cable 1. The truck 4 consists of a pair of suitably conformed plates between which are mounted the rollers 5, said rollers being suitably shaped to run in a vertical direction upon the short track or guide-way 6. Said track or guide-way 6 is carried by rearwardly extended arms mounted upon a frame 7. The lower end of the track or guide-way 6 is adjustably secured as at 6' in order to permit a variation of the position of the guide-way 6. That is, the guide-way may be adjusted to give it a certain amount of inclination with regard to the vertical. Pivotally mounted on the frame or support 7 is a lever 8 having a forwardly extending arm 9 which is suitably shaped to engage a pin 10 projecting transversely from the side of the truck 4. The opposite arm of the lever 8 carries a suitably adjustable counterweight 11. The movable end of the cable is mounted, in its normal position so as to rest slightly above the horizontal line taken through the fixed end of said cable, thereby causing a slight rearward inclination of said cable. Furthermore, the tension of the cable, and the relative weights of the empty bucket and counterweight are so chosen that when the bucket has been emptied at the lower end of the cable which is the right hand end in the figures shown, the counterweight will act to raise the truck 4 and consequently the movable end of the cable tends to bring the latter into the normal condition of rearward inclination above mentioned, whereupon the carrier of the bucket 2 will be free to run toward the support 3. As soon as the bucket is loaded, its weight will overcome the downward pressure of the counterweight 11, and will begin to travel toward the movable end of the cable, and the closer its approach to the movable end of the cable, the greater will be the depression of the truck 4, and the consequent increase in the forward inclination of the cable 1 and the increase in elevation of the counterweight 11, until the bucket 2 has reached the limit of movement upon said cable. Suitable tripping mechanism, as hereinafter described, is provided for either manually or automatically dumping the bucket at the end of its travel.

In the form shown in Figs. 3 and 4, the cable 1 is secured to the shaft or frame of the trolley or truck element 5' whose frame terminates in an extension 4' which is pivotally connected to the arm 9' of a two armed lever 8' whose opposite end carries a counterweight 11. Said two-armed lever 8' is secured to the upper free end of a curved yoke 12. The truck element 5' operates on a track or guide-way 13 which has its upper end fixedly secured to the opposite end of the curved yoke 12 and has its lower end adjustably secured in a suitable manner to the frame 7 as described for Figs. 1 and 2. The operation of this modification is substantially like that of the form described in Figs. 1 and 2, the dotted line indicating the positions of the various elements when the bucket has been dumped and the return run has been started. It will be noted that in this form only one roller is used, this roller practically constituting the whole truck element and being of greater size, relatively, than the roller of truck 4.

Figs. 5 and 6 show a form of the apparatus in which the tension of the cable is varied in accordance with the position and weight of the bucket. In order to permit variation in the tension of the cable or track way 1, the track or guide-way 14 is inclined as indicated in Fig. 5, so that when the truck 4 is in its lowermost position, which is that which it will assume when the loaded bucket is progressing toward the movable end of the cable, there will be a reduction in the tension of the cable. As soon as the truck has reached the dumping position, and is emptied, the counterweight 11 begins to act and the truck 4 is elevated, with the consequence that as it nears the upper end of the guide-way 14, the cable 1 is not only elevated but is drawn tighter, since the distance between the fixed end of the cable and the upper end of the guide-way 14 is greater than that between the fixed end of the cable and the lower end of said guide-way. In this way it is insured that the bucket will return the distance to its starting point.

Having thus described my invention, what I claim is:—

1. A conveyer, comprising in combination, a cable having a fixed end and a movable end, a bucket traveling on said cable, a truck supporting said movable end, a guideway for permitting vertical movement of said truck, and a counterweight mechanism mounted to swing with the movement of said truck, said truck being normally raised to its elevated position on said guideway by said counterweight mechanism when the bucket is empty, but being depressed in opposition to said counterweight to incline the cable downwardly toward said truck by said bucket when the latter is loaded, whereby the inclination of the cable is alternately reversed to cause the bucket to travel.

2. A conveyer, comprising in combination, a cable having a fixed end and a movable end, a traveling bucket on said cable, a truck supporting said movable end, a guideway for permitting vertical movement of said truck, said guideway being mounted with an inclination adapted to decrease the tension on said cable when the truck is in its lowered position, and a counterweight device mounted in operative contact with said truck to normally maintain the latter in elevated position when said bucket is unloaded and to yield to permit said truck to lower the movable end of the cable when the bucket is loaded.

3. A conveyer, comprising in combination, a cable having a fixed end and a movable end, a bucket traveling on said cable, a truck supporting said movable end, a guideway for permitting vertical movement of said truck, said guideway being inclined to diminish the tension of said cable when the truck is at the lower end thereof, and means to overcome the weight of an empty bucket when the latter is at the movable end of the cable and to permit the descent of said truck to incline said cable when the bucket is loaded, the loaded bucket acting to depress the cable against said means to overcome the weight of the empty bucket.

In testimony whereof I affix my signature in presence of two witnesses.

CHRISTOPH W. F. HANSEN.

Witnesses:
　FERDINAND ROHWEDOHR,
　ADOLPH HÜMMEL.